US012386658B2

(12) United States Patent
Lu et al.

(10) Patent No.: US 12,386,658 B2
(45) Date of Patent: Aug. 12, 2025

(54) PULL MODE AND PUSH MODE COMBINED RESOURCE MANAGEMENT AND JOB SCHEDULING METHOD AND SYSTEM, AND MEDIUM

(71) Applicant: SUN YAT-SEN UNIVERSITY, Guangdong (CN)

(72) Inventors: Yutong Lu, Guangdong (CN); Zhiguang Chen, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 573 days.

(21) Appl. No.: 17/917,246

(22) PCT Filed: Jun. 23, 2020

(86) PCT No.: PCT/CN2020/097673
§ 371 (c)(1),
(2) Date: Oct. 6, 2022

(87) PCT Pub. No.: WO2021/208240
PCT Pub. Date: Oct. 21, 2021

(65) Prior Publication Data
US 2023/0161620 A1    May 25, 2023

(30) Foreign Application Priority Data

Apr. 14, 2020   (CN) .......................... 202010290642.5

(51) Int. Cl.
*G06F 9/46*    (2006.01)
*G06F 9/48*    (2006.01)
*G06F 9/50*    (2006.01)

(52) U.S. Cl.
CPC ............ *G06F 9/4881* (2013.01); *G06F 9/505* (2013.01)

(58) Field of Classification Search
CPC ...................................................... G06F 9/4881
(Continued)

(56) References Cited

U.S. PATENT DOCUMENTS 10,291,730 B1 *   5/2019   Shavell ................... H04L 47/83
11,182,691 B1 *  11/2021   Zhang .................... G06N 20/20
(Continued)

FOREIGN PATENT DOCUMENTS

CN         104853384         8/2015
CN         108710543         10/2018
(Continued)

OTHER PUBLICATIONS

Yu-Ting Kao et al., "Bottleneck-Centric Pull and Push Allocation and Sequencing of Wet-bench and Furnace", e-Manufacturing & Design Collaboration Symposium 2013, Sep. 2013, pp. 1-4.
(Continued)

*Primary Examiner* — Mehran Kamran
(74) *Attorney, Agent, or Firm* — JCIP GLOBAL INC.

(57) ABSTRACT

Provided in the present invention are a Pull mode and Push mode combined resource management and job scheduling method and system, and a medium. The present invention includes parsing or identifying jobs to determine types, scheduling the jobs according to the types, and for high-performance computing jobs, distributing the jobs by using a Push mode: distributing computing nodes for the high-performance computing jobs, and pushing the high-performance computing jobs to the distributed computing nodes for execution; and for a big data processing job, using a Pull mode to perform distribution: waiting for a job request of each computing node, and when the computing node actively transmits the job request, transmitting the big data processing job to the computing node, which actively transmits the job request, for execution.

9 Claims, 1 Drawing Sheet

(58) Field of Classification Search
USPC .......................................................... 718/104
See application file for complete search history.

(56) References Cited

U.S. PATENT DOCUMENTS

| | | | | |
|---|---|---|---|---|
| 12,311,522 | B2* | 5/2025 | Davis | G01D 5/145 |
| 2009/0210876 | A1* | 8/2009 | Shen | G06F 9/505 |
| | | | | 718/100 |
| 2014/0223443 | A1* | 8/2014 | Ashok | G06F 9/4881 |
| | | | | 718/103 |
| 2016/0292011 | A1* | 10/2016 | Colson | G06F 9/5027 |
| 2016/0301623 | A1* | 10/2016 | Ramsden-Pogue | H04L 47/78 |
| 2017/0102971 | A1* | 4/2017 | Blagodurov | G06F 9/5038 |
| 2017/0357531 | A1* | 12/2017 | Zhang | G06F 9/5027 |
| 2018/0239617 | A1* | 8/2018 | Zusman | G06F 9/544 |
| 2019/0310930 | A1* | 10/2019 | Joglekar | G06F 9/52 |
| 2020/0050530 | A1* | 2/2020 | Orth | G06F 9/5083 |
| 2020/0250787 | A1* | 8/2020 | Cheng | G06F 9/4881 |
| 2020/0272509 | A1* | 8/2020 | Wright | G06F 9/4881 |
| 2020/0272511 | A1* | 8/2020 | Gauthier | G06F 9/5038 |
| 2020/0272522 | A1* | 8/2020 | Gauthier | G06F 9/505 |
| 2020/0272523 | A1* | 8/2020 | Gauthier | G06F 9/5072 |
| 2022/0197773 | A1* | 6/2022 | Butler | G06F 9/505 |
| 2023/0161620 | A1* | 5/2023 | Lu | G06F 9/4881 |
| | | | | 718/104 |

FOREIGN PATENT DOCUMENTS

| | | |
|---|---|---|
| CN | 109656911 | 4/2019 |
| CN | 109933306 | 6/2019 |

OTHER PUBLICATIONS

"International Search Report (Form PCT/ISA/210) of PCT/CN2020/097673," mailed on Jan. 22, 2021, with English translation thereof, pp. 1-5.

* cited by examiner

PULL MODE AND PUSH MODE COMBINED RESOURCE MANAGEMENT AND JOB SCHEDULING METHOD AND SYSTEM, AND MEDIUM

CROSS-REFERENCE TO RELATED APPLICATION

This application is a 371 application of the international PCT application serial no. PCT/CN2020/097673, filed on Jun. 23, 2020, which claims the priority benefit of China application no. 202010290642.5, filed on Apr. 14, 2020. The entirety of each of the above-mentioned patent applications is hereby incorporated by reference herein and made a part of this specification.

TECHNICAL FIELD

The invention relates to the field of resource management and job scheduling of large-scale computer systems, in particular to a Pull mode and Push mode combined resource management and job scheduling method and system, and a medium.

RELATED ART

Resource management and job scheduling have always been challenging in large-scale computing systems. At present, the scale of computing systems is getting bigger and bigger. For example, the Sunway TaihuLight supercomputer consists of 40,000 computing nodes, and the number of processor cores reaches tens of millions. With the prevalence of the "CPU+accelerator" mode, the computing systems generally show heterogeneity. For example, the Summit supercomputer, the fastest supercomputer by far, has 6 GPUs per node. As large-scale computing has become the basic means to promote technological progress in various industries, a large number of jobs with different characteristics are submitted to the computing systems, resulting in disorderly resource competition. In the above complex scenarios, efficient and effective resource management and job scheduling for heterogeneous systems are facing great challenges.

Resource management and job scheduling are classic topics in the field of computer system research. Existing large-scale resource management and job scheduling systems with similar functions to the invention mainly include the NQS and PBS systems developed by NASA in the early days, the LSF system developed by IBM, and the Slurm open source scheduling system which is the most widely used in TOP500 supercomputers. These large-scale resource management and job scheduling systems are all developed for high-performance computing.

NQS (Network Queueing System) is a batch queuing system developed by NASA, which supports batch requests and device requests, supports the resource restriction function implemented by the underlying Unix core, and associates resource restriction with batch requests and batch queues. NQS is mainly composed of nine modules: nqsdaemon, logdaemon, netshepherd, netdaemon, netclient, reqserver, pipeclient, rrpipeclient and lbpipeclient, which are functionally responsible for requests, logs, networks and so on, respectively.

PBS (Portable Batch System) is a job management system developed by NASA, which supports multiple operating platforms, batch and interactive jobs, and serial and multiple parallel jobs. PBS consists of server, MOM (Machine Oriented Miniserver), scheduler modules and a command tool set. Server is a management module, which is responsible for the management and submission of user tasks and ensures the stable operation of the whole job management system. MOM is a job execution module, also called job executor, which is a daemon, responsible for putting jobs submitted by users into an execution queue, and returning the output of the jobs to users after the jobs run. One PBS can be stored in several different MOMs to meet different user needs through different job scheduling strategies. Scheduler is a job scheduling module, also called job scheduler, which is responsible for scheduling when, at which node and in what way jobs in the execution queue should run, and can communicate with different MOMs and get the status of the execution queue, then verify the validity of jobs through the server, and finally schedule jobs according to the scheduling strategy. The command tool set of PBS is mainly used for submitting, monitoring, modifying and deleting jobs.

LSF (Load Sharing Facility) is a distributed resource management tool developed by Platform companies in Canada, which is used to schedule, monitor and analyze the load of net-connected computers. The purpose is to fully share computer resources such as CPU, memory, and disk through centralized monitoring and scheduling. LSF adopts a loose coupling structure, which is mainly composed of five parts: LSF Base, LSF Batch, LSF Job-scheduler, LSF Multi-Cluster and LSF Analyzer. The LSF Base provides dynamic load management and transparent resource access, the LSF Batch provides job scheduling processing in a heterogeneous environment, the LSF Job-scheduler provides time-driven job scheduling based on computing nodes, the LSF Multi-Cluster supports resource sharing among multiple supercomputers connected to the network, and the LSF Analyzer is responsible for comprehensive data analysis of jobs and generates accounting reports.

Slurm (Simple Linux Utility for Resource Management) is a highly scalable and fault-tolerant cluster manager and job scheduling system that can be used for large-scale computing node clusters. Slurm maintains a queue of pending work and manages the overall resource utilization of the cluster. It manages available computing nodes in an exclusive or non-exclusive way (depending on resource requirements) for users to perform their work. Slurm will allocate resources reasonably for the task queue and monitor the job until it is completed.

Slurm is mainly composed of a control process slurmctld, a node monitoring process slurmd, a job management process slurmstepd, an accounting storage process slurmdbd and a command tool set. The control process slurmctld and the accounting storage process slurmdbd are deployed on a management node. Slurmctld, the brain of Slurm, is responsible for resource allocation, and job scheduling and management control of the whole supercomputer. Slurmdbd enables users and the control process to access a middle layer of an accounting database, and plays a role in user authentication and security isolation. The node monitoring process slurmd is a daemon of a computing node, and is responsible for collecting the resource status of the node and reporting it to the control process. Slurmd also receives requests from the control process and user commands, and performs job step task loading, job cancellation and so on. The job management process slurmstepd is derived when slurmd performs job step task loading or job batching, and is responsible for starting, I/O forwarding, signal transmission, accounting information collection, etc. of all tasks of a corresponding job step on this node.

The above resource management and job scheduling systems show certain limitations when faced with very large-scale computing systems and complex job types. NQS is a job management system proposed in the early days, which has many obvious defects. In the aspect of job management, NQS cannot record the running time, ending time, when the job is held and released, and other running information and state change information, which is inconvenient for users to query the running status of the job. In terms of system structure, the resource management function of NQS is divided into two parts and scattered in different modules, and it can only manage resources of its own computer, but not all the hosts in the cluster. A default resource scheduling policy FIFO in PBS reduces the resource utilization rate of the system, and does not guarantee the fairness of large jobs. The PBS scheduler scans the job queue circularly, and executes a first job which meets the current effective system resource requirements. This mechanism leads to the shortage of resources needed by large jobs, which prevents them from running, thus resulting in starvation. In order to ensure the fairness of large jobs, the FIFO scheduler implements a hunger job scheduling method. According to the method, when the waiting time of a job exceeds a certain time limit, resources required by the job are reserved, that is, when some of these resources become available, they are not allocated to other jobs, and the job is put into operation when all reserved resources are available. During this period, the scheduler will not run other jobs on the node. Although the reservation strategy solves the starvation problem, serious node resource idleness is caused, the resource utilization rate of the system is reduced, and the throughput rate of the system is reduced. Besides, the fairness of big jobs cannot be guaranteed, and the average job waiting time of the system is increased.

In addition to the shortcomings analyzed above, the above existing resource management and job scheduling systems have a common feature, that is, a centralized job management architecture. The so-called centralized architecture means that the maintenance of job load information, the management of job queues, the maintenance of system resource information, and job scheduling and assignment to idle resources are all undertaken by a specific central server or daemon. A serious hidden danger of the centralized architecture is that the central scheduler is likely to become the performance bottleneck and single trouble spot of the whole system. Especially as the scale of the system expands, the workload types become more and more complex, and the heterogeneity of system resources is further enhanced, if the centralized architecture is still adopted to complete all scheduling tasks simply by relying on a master node, the running efficiency and scalability of the whole system will be seriously affected.

SUMMARY OF INVENTION

Technical Problem

The technical problem to be solved by the invention is to provide a Pull mode and Push mode combined resource management and job scheduling method and system, and a medium in view of the above problems in the prior art. The invention can disperse the workload of a master node in a traditional system, reduce the bottleneck effect brought thereby, and improve the resource utilization rate of the system. The invention has the advantages of good universality, high resource utilization rate, high system throughput and good scalability.

Solution to Problem

In order to solve the above problems, the present invention adopts the following technical solutions:

A Pull mode and Push mode combined resource management and job scheduling method, comprising the following steps:

1) receiving jobs;

2) analyzing or identifying the jobs, and determining whether each job is a high-performance computing job or a big data processing job; and 3) scheduling different types of jobs respectively, distributing the high-performance computing jobs obtained by scheduling in a Push mode, that is, allocating computing nodes for the high-performance computing jobs and pushing the high-performance computing jobs to the allocated computing nodes for execution; and distributing the big data processing jobs obtained by scheduling in a Pull mode, that is, waiting for job requests of the computing nodes, and when the computing nodes actively send the job requests, sending the big data processing jobs to the computing nodes which actively send the job requests for execution.

Optionally, wherein scheduling different types of jobs in step 3) specifically comprises:

S1), determining whether there are jobs which cannot tolerate waiting, if so, selecting a job which cannot tolerate waiting as a scheduled job and executing S1), and otherwise, jumping to the next step;

S2), determining whether there are jobs issued by designated high-performance computing applications, if so, selecting a job issued by designated high-performance computing applications as a scheduled job and executing S1), and otherwise, jumping to the next step;

S3), counting the number of processor cores occupied by scheduled jobs through a sliding window, calculating the average number of processor cores occupied by all jobs, determining whether there are jobs which require a larger number of processor cores than the average number, if so, selecting a job which requires a larger number of processor cores than the average number as a scheduled job and executing S1), and otherwise, jumping to the next step;

S4), determining whether there are workflow jobs containing multiple jobs, if so, selecting a workflow job containing multiple jobs as a scheduled job and executing S1), and otherwise, jumping to the next step; and S5), determining whether jobs to be scheduled are empty, if not, selecting a workflow job containing multiple jobs as a scheduled job and executing S1), and otherwise, directly executing S1.

Optionally, The Pull mode and Push mode combined resource management and job scheduling method, wherein allocating computing nodes for the high-performance computing jobs and pushing the high-performance computing jobs to the allocated computing nodes for execution in step 3) specifically comprises:

3.1A), reading a computing node allocation table to obtain available computing nodes which shows an available state for the current scheduling node;

3.2A), determining whether the available computing nodes of the current scheduling node can meet the requirements of the high-performance computing jobs, if so, directly taking the available computing nodes of the current scheduling node as the computing nodes allocated to the high-performance computing jobs, and otherwise, negotiating and communicating with other scheduling nodes to obtain available computing nodes of other scheduling nodes as auxiliary computing nodes, and jointly taking the available computing nodes of the current scheduling node and the auxiliary computing nodes as the computing nodes allocated to the high-performance computing jobs;

3.3A), pushing the high-performance computing jobs to the allocated computing nodes for execution, and marking the allocated computing nodes as unavailable in the computing node allocation table; and 3.4A), waiting for response results of the allocated computing nodes executing the high-performance computing jobs, and if the response result of the high-performance computing jobs returned by any allocated computing node is received, restoring the availability state of the allocated computing node in the computing node allocation table to be available.

Optionally, wherein when negotiating and communicating with other scheduling nodes in 3.2A) to obtain available computing nodes of other scheduling nodes, other scheduling nodes obtain available computing nodes which show an available state for the current scheduling node, and the corresponding available computing nodes are returned to the scheduling node initiating the negotiation and communication as auxiliary computing nodes.

Optionally, wherein the computing node allocation table is a BitMap, the length of which is the number of computing nodes managed by the current scheduling node, and each bit indicates the availability state of the corresponding computing node by 1 and 0.

Optionally, wherein the computing nodes actively sending the job requests specifically comprises: obtaining the resource usage of the current computing node, and if the resource usage of the current computing node is less than a preset value, actively sending a job request to a corresponding scheduling request.

Optionally, wherein whether the resource usage of the current computing node is less than the preset value is determined based on one or more of CPU utilization, memory utilization, accelerator utilization, and the number of running computing tasks.

In addition, the present invention also provides a Pull mode and Push mode combined resource management and job scheduling system, comprising a computer device, wherein the computer device is programmed or configured to execute the steps of the Pull mode and Push mode combined resource management and job scheduling method, or a computer program programmed or configured to execute the Pull mode and Push mode combined resource management and job scheduling method is stored in a memory of the computer device.

In addition, the present invention also provides a Pull mode and Push mode combined resource management and job scheduling system, comprising a scheduling cluster and a computing cluster, wherein the scheduling cluster comprises one or more scheduling nodes, the computing cluster comprises a plurality of computing nodes, and each scheduling node manages one or more corresponding computing nodes; and the scheduling node is programmed or configured to execute the steps of the Pull mode and Push mode combined resource management and job scheduling method, or a computer program programmed or configured to execute the Pull mode and Push mode combined resource management and job scheduling method is stored in a memory of the scheduling node.

In addition, the present invention also provides a computer-readable storage medium, on which a computer program programmed or configured to execute the Pull mode and Push mode combined resource management and job scheduling method is stored.

Effects of Invention

Compared with the prior art, the invention has the following technical advantages.

1. Good universality: The invention comprehensively considers the characteristics of two kinds of job loads, namely, high-performance computing and big data processing, in system design. Compared with the prior art, the invention can realize better scheduling of integrated loads of these two kinds of jobs, so that the system is more versatile.

2. High resource utilization rate: A job node applies to a scheduling node for job execution based on its own resource usage, thus realizing more reasonable and optimized job allocation based on the present situation of existing resources. This design makes full use of idle resources to a certain extent, thus improving the resource utilization rate of the system.

3. High system throughput: Because the job node can actively apply for jobs to the scheduling node, compared with the prior art that a traditional system can only passively wait for an assigned job for execution, this can shorten the response time of Pulled jobs to a certain extent, and the concurrency brought by multiple job nodes applying for job execution at the same time can further promote this effect. Therefore, on the whole, the invention improves the throughput rate of the system.

4. Good scalability: Because the scheduling node does not need to maintain global resource information with fine granularity and a computing node does not need to report the resource status to a control node frequently, the communication overhead of the system and the load of the master node are reduced, which, to some extent, reduces the bottleneck effect caused by the master scheduling node in the traditional system, thus improving the system scalability.

BRIEF DESCRIPTION OF DRAWINGS

In order to more clearly explain the technical scheme of the embodiments of this application, the drawings needed in the embodiments will be briefly introduced below. Obviously, the drawings described below are only some of the embodiments of this application. For those of ordinary skill in the art, other drawings can be obtained according to the provided drawings without any creative effort.

DESCRIPTION OF EMBODIMENTS

Figure 1:
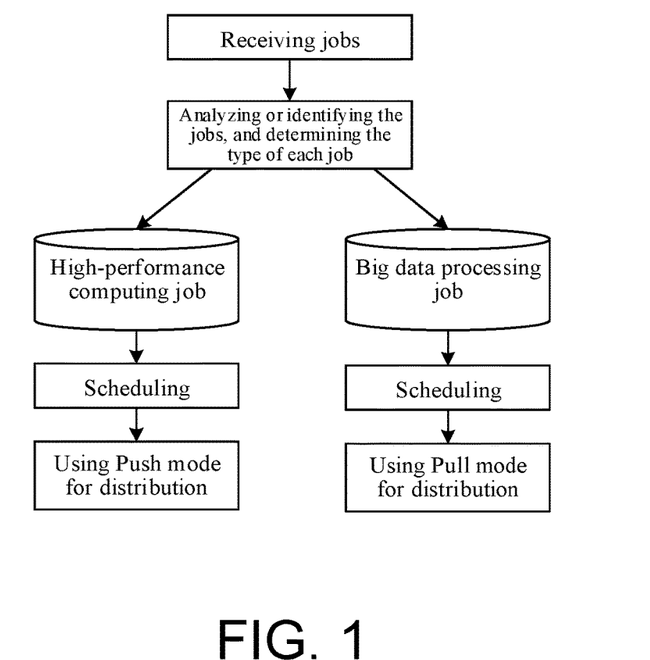
FIG. 1 is a basic flowchart of a method according to an embodiment of the invention.

As shown in FIG. 1, a Pull mode and Push mode combined resource management and job scheduling method comprises the following steps:

1) receiving jobs;

2) analyzing or identifying the jobs, and determining whether each job is a high-performance computing job or a big data processing job, wherein it should be noted that different types of jobs can be stored together or separately as needed, and storage modes may vary according to requirements, such as queues and linked lists; and 3) scheduling different types of jobs respectively, distributing the high-performance computing jobs obtained by scheduling in a Push mode, that is, allocating computing nodes for the high-performance computing jobs and pushing the high-performance computing jobs to the allocated computing nodes for execution; and distributing the big data processing jobs obtained by scheduling in a Pull mode, that is, waiting for job requests of the computing nodes, and when the computing nodes actively send the job requests, sending the big data processing jobs to the computing nodes which actively send the job requests for execution.

In this embodiment, a job management system not only has a traditional mode that a master node pushes jobs to the computing node, but also has a Pull mode that the computing node actively applies to the master node for job execution. The two modes are for different types of jobs. For high-performance computing jobs represented by traditional numerical simulation applications, they often need a lot of continuous resources, and the computing time is long, so the master node divides fixed system resources, and then pushes the jobs to the divided resource areas (allocated computing nodes) for execution. However, for big data processing jobs represented by data analysis applications, their resource requirements are generally small and execution time is short, so they are probably high-throughput jobs, and the computing nodes actively pull jobs from the master node for execution. It should be noted that the job type can be determined by an analytical method, that is, a job generator specifies the job type as high-performance computing job or big data processing job in the job in advance, so that the job can be controlled artificially. In addition, considering that job content in large-scale computing systems has specific syntax formats, it is also possible to determine the job type by identifying the job content.

The job management system adopting the Pull mode and Push mode combined resource management and job scheduling method of this embodiment not only has a traditional mode that a master node pushes jobs to the computing node, but also has a Pull mode that the computing node actively applies to the master node for job execution. The two modes are for different types of jobs. For high-performance computing jobs represented by traditional numerical simulation applications, they often need a lot of continuous resources, and the computing time is long, so the master node divides fixed system resources, and then pushes the jobs to the divided resource areas for execution. However, for big data processing jobs represented by data analysis applications, their resource requirements are generally small and execution time is short, so they are probably high-throughput jobs, and the computing nodes actively pull jobs from the master node for execution. This novel design also brings many advantages. Firstly, part of the scheduling tasks are separated from the task scope of the traditional master node, which reduces the workload of the master node and the possibility that the master node becomes the bottleneck of the system, thus improving the scalability of the system. Secondly, after the master node of the system has pushed some jobs, the resource usage in the computing node has changed; and at this point, if the Pull mode is used, the computing node does not need to actively report the resource usage to the master node, thus reducing the communication overhead of the system caused by message transmission. In addition, when the master node of the system pushes jobs, for some jobs, node resources do not meet the job requirements; at this point, the jobs cannot be pushed to the computing node, which will result in idleness of resources on the computing node; however, if the Pull mode is adopted, the computing node actively pulls small jobs which can be executed on it, thus making full use of the idle resources and improving the resource utilization rate of the system. Finally, the invention comprehensively considers large jobs and small jobs, and implements reasonable scheduling strategies for both, especially the design that the computing node actively pulls small jobs for execution will effectively reduce the average waiting time of jobs, thus improving the job throughput rate of the system.

The above scheduling strategy is mainly proposed for the scenario where high-performance computing and big data processing are combined. Therefore, the invention firstly analyzes the characteristics and requirements of high-performance computing and big data processing, and shows that there are great differences in their execution modes. Generally, the amount of data processed by high-performance computing jobs is small, and the requirements for network communication in job scheduling are not high; synchronous operation is likely to exist among processes belonging to the same job, and these processes must be distributed to the compute node together; computing generally does not require high real-time performance and can tolerate queuing; and the calculation amount is large, and once the job is started, it will run for a long time. In contrast, big data processing jobs may face a large data set, so data migration should be considered when scheduling jobs; the whole job may be composed of several dependent stages, and it is difficult for the scheduling system to make perfect decisions when distributing tasks because the calculation amount of each stage cannot be accurately estimated; some processing tasks need to be executed in real time, so job scheduling has priority requirements; and the running time of each job varies greatly.

According to the above job characteristic analysis, the invention formulates the following simple scheduling principles. ① Priority scheduling of jobs with real-time requirements: Specifically, resource management and job scheduling systems generally allow users to indicate whether they can tolerate waiting when submitting jobs, if not, it means that the jobs have real-time requirements and can be scheduled first. ② Priority scheduling of jobs issued by high-performance computing applications. ③ Priority scheduling of large-scale jobs: Specifically, the job scheduling system counts the number of processor cores occupied by scheduled jobs through a sliding window, and calculates the average number of processor cores occupied by all jobs, and jobs occupying more processor cores than the average number are regarded as big jobs. ④ Priority scheduling of complex workflows: Specifically, a workflow contains multiple jobs, which are packaged and submitted to the job scheduling system in the form of directed acyclic graph. The above four principles are sorted in order of importance. Based on these principles, the scheduling of high-performance computing jobs and big data processing jobs are optimized respectively. In this embodiment, scheduling different types of jobs in step 3) specifically comprises:

S1), determining whether there are jobs which cannot tolerate waiting, if so, selecting a job which cannot tolerate waiting as a scheduled job and executing S1), and otherwise, jumping to the next step;

S2), determining whether there are jobs issued by designated high-performance computing applications, if so, selecting a job issued by designated high-performance computing applications as the scheduled job and executing S1), and otherwise, jumping to the next step;

S3), counting the number of processor cores occupied by scheduled jobs through a sliding window, calculating the average number of processor cores occupied by all jobs, determining whether there are jobs which require a larger number of processor cores than the average number, if so, selecting a job which requires a larger number of processor cores than the average number as a scheduled job and executing S1), and otherwise, jumping to the next step;

S4), determining whether there are workflow jobs containing multiple jobs, if so, selecting a workflow job containing multiple jobs as a scheduled job and executing S1), and otherwise, jumping to the next step; and S5), determining whether jobs to be scheduled are empty, if not, selecting a workflow job containing multiple jobs as a scheduled job and executing S1, and otherwise, directly executing S1.

In this embodiment, allocating computing nodes for the high-performance computing jobs and pushing the high-performance computing jobs to the allocated computing nodes for execution specifically comprises:

3.1A), reading a computing node allocation table to obtain available computing nodes which shows an available state for the current scheduling node;

3.2A), determining whether the available computing nodes of the current scheduling node can meet the requirements of the high-performance computing jobs, if so, directly taking the available computing nodes of the current scheduling node as the computing nodes allocated to the high-performance computing jobs, and otherwise, negotiating and communicating with other scheduling nodes to obtain available computing nodes of other scheduling nodes as auxiliary computing nodes, and jointly taking the available computing nodes of the current scheduling node and the auxiliary computing nodes as the computing nodes allocated to the high-performance computing jobs;

3.3A), pushing the high-performance computing jobs to the allocated computing nodes for execution, and marking the allocated computing nodes as unavailable in the computing node allocation table; and 3.4A), waiting for response results of the allocated computing nodes executing the high-performance computing jobs, and if the response result of the high-performance computing jobs returned by any allocated computing node is received, restoring the availability state of the allocated computing node in the computing node allocation table to be available.

In this embodiment, when negotiating and communicating with other scheduling nodes in 3.2A) to obtain available computing nodes of other scheduling nodes, other scheduling nodes obtain available computing nodes which show an available state for the current scheduling node, and the corresponding available computing nodes are returned to the scheduling node initiating the negotiation and communication as auxiliary computing nodes.

In this embodiment, the computing node allocation table is a BitMap, the length of which is the number of computing nodes managed by the current scheduling node, and each bit indicates the availability state of the corresponding computing node by 1 and 0. The computing node allocation table realized by the BitMap is used to record the availability state of computing nodes, which has the advantages of low resource consumption and high reading and writing speed.

In this embodiment, the computing nodes actively sending the job requests specifically comprises: obtaining the resource usage of the current computing node, and if the resource usage of the current computing node is less than a preset value, actively sending a job request to a corresponding scheduling request.

In this embodiment, whether the resource usage of the current computing node is less than the preset value is determined based on one or more of CPU utilization, memory utilization, accelerator utilization, and the number of running computing tasks.

Frequent small message communication exists among the processes of high-performance computing jobs, and a supercomputer network has a specific topology. If all the processes of a job are distributed to topologically discontinuous areas, the communication overhead in the running process is very high. Therefore, the scheduling system should try to schedule high-performance computing jobs to a continuous area. However, on a platform where high-performance computing jobs and big data processing jobs are combined, after a large number of irregular big data processing jobs are scheduled and executed, available computing resources are gradually fragmented, which makes it difficult to find a continuous resource area for large-scale high-performance computing jobs to be scheduled and executed. Generally, high-performance computing jobs do not require high real-time performance, and can tolerate certain waiting delay. Therefore, the scheduling system can properly migrate some jobs and plan a continuous resource area to ensure the efficient execution of high-performance computing jobs. The feasibility of the above scheduling measures is based on the following: ① the calculation amount of big data processing jobs is generally not large; this embodiment will perform more fine-grained task division on big data processing jobs; when a computing node is occupied by big data processing jobs, computing tasks will be completed within a short time and released, and the waiting time of high-performance computing jobs will not be too long; ② in this embodiment, a data interaction system based on memory cache will be developed for big data processing jobs; if there are still residual data of big data processing jobs on computing nodes to be migrated, the scheduling system can rely on a high-speed customized network of supercomputers to realize rapid data migration; and ③ the execution time of high-performance computing jobs is generally very long; although certain waiting delay will be introduced in the process of waiting for the migration of big data processing jobs, communication delay will be significantly reduced in the subsequent running process, and the total execution time will be effectively shortened.

For the scheduling of big data processing jobs, the basic idea of this embodiment is: firstly, fine-grained task division is performed on the job, and then a large number of fine-grained tasks obtained are distributed to computing nodes in a high-throughput manner. The core of high-throughput scheduling comprises two aspects: cluster scheduling and task distribution among computing nodes. Because of the large number of small-granularity tasks, a traditional single control point scheduling system will inevitably become a bottleneck. This embodiment adopts the cluster scheduling system to deal with the above problems. Different from cluster metadata management, the cluster scheduling system has no strict requirements on consistency. Even if the data maintained by each node in a cluster are inconsistent, it will only cause some computing nodes to be overloaded or idle, but will not cause serious consequences. Therefore, the cost of maintaining a scheduling cluster is not large. In this embodiment, all computing nodes are grouped, each group corresponds to a scheduling node, and all scheduling nodes form a scheduling cluster. When there are still undistributed fine-grained tasks on a scheduling node, tasks are distributed to the computing node group managed by itself preferentially. If the group managed by itself faces a resource shortage, resources of adjacent scheduling nodes can be borrowed. The borrowed computing node sends a task execution status to the borrowing scheduling node, but reports resource usage to its own scheduling node. When distributing tasks, a high-throughput scheduling framework designed in this embodiment does not directly distribute tasks to specific computing nodes, but pushes a group of tasks to a set of computing nodes, and finally completes task scheduling through task distribution among computing nodes. Specifically, each scheduling node further divides its own computing node group into subgroups, which are the smallest units to receive tasks. All computing nodes in each subgroup form an MPI communication group, and claim tasks through internal negotiation when receiving computing tasks. The above innovative measures can effectively reduce the communication overhead between computing nodes and scheduling nodes. As further optimization, this embodiment will adopt an optimistic strategy to distribute tasks to each subgroup, that is, always assume that resources in a target subgroup are abundant, and continuously distribute tasks to the target subgroup until a rejection message returned by the subgroup is received.

In the above discussion, the scheduling strategies for high-performance computing jobs are all based on the Push mode, that is, scheduling nodes push tasks to computing nodes, which is also the mode adopted by most scheduling systems at present. In this embodiment, the Pull mode is introduced into the scheduling system as an important supplement to the Push mode. Big data processing systems are likely to face heterogeneous computing nodes, and it is difficult for programmers to make perfect division when assigning tasks between a CPU and an accelerator to ensure that both computing components are fully utilized. The computing resources of one computing node are fully utilized, but its memory utilization rate may not be high. High-performance computing jobs output intermediate computing results mainly through IO operation, and computing resources are idle. The above factors indicate that resource waste is a common phenomenon in the system. The fundamental reason is that scheduling nodes cannot accurately know the usage of all kinds of resources on all computing nodes, but a resource daemon on each computing node can get this information. Therefore, allowing computing nodes to actively pull tasks from scheduling nodes can effectively alleviate the problem of idle resources. Based on the above ideas, this embodiment will periodically gather all the idle resources in each subgroup of computing nodes, and request task sets from scheduling nodes according to the idle situation. Scheduling nodes obtain the task sets which can be successfully executed through matching according to the resource description of the received requests, and then send the task sets to the target subgroup through the high-throughput scheduling framework. In a word, this embodiment adds the Pull mode on the basis of the traditional job distribution mechanism featuring the Push mode, so as to better meet the scheduling requirements of the scenario where big data processing jobs and high-performance computing jobs are combined. In the traditional Push mode, the job scheduler actively pushes tasks to computing nodes. This mode requires the job scheduler to estimate the usage of computing resources such as CPU, memory and accelerator on computing nodes accurately. However, in an actual system, global resource monitoring of heterogeneous computing nodes on a large-scale platform can not ensure accuracy, and will introduce a lot of memory and communication overhead. Therefore, on the basis of the traditional Push mode, this embodiment introduces the Pull mode to study a scheduling strategy featuring a combination of the Push mode and the Pull mode. The job scheduler is only responsible for task division, and no longer implements fine-grained real-time monitoring on computing nodes. For large-scale synchronous jobs represented by a BSP model, the Push mode is adopted to push tasks from the job scheduler to computing nodes, which ensures that large jobs can get sufficient resources smoothly. For high-throughput jobs which can be divided into fine-grained small tasks, computing nodes monitor their own resource usage, and actively request executable tasks from the job scheduler by adopting the Pull mode, so as to improve the resource utilization rate.

In addition, this embodiment also provides a Pull mode and Push mode combined resource management and job scheduling system, comprising a computer device, which is programmed or configured to execute the steps of the above Pull mode and Push mode combined resource management and job scheduling method, or a computer program programmed or configured to execute the above Pull mode and Push mode combined resource management and job scheduling method is stored in a memory of the computer device.

Figure 2:
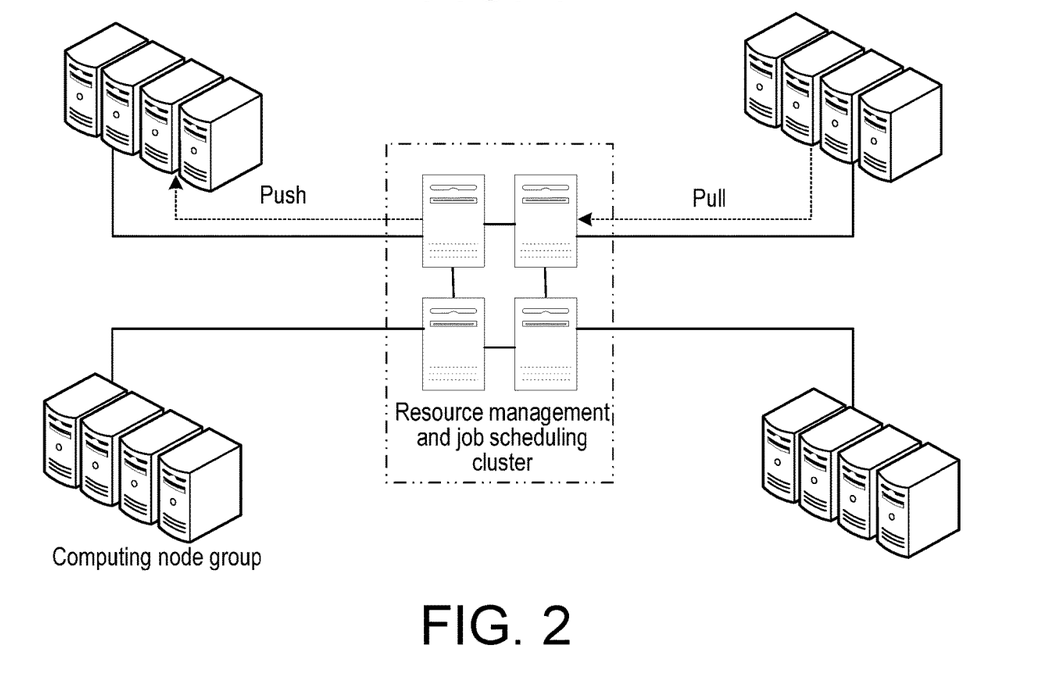
FIG. 2 is a structural diagram of a resource management and job scheduling system according to an embodiment of the invention.

In addition, as shown in FIG. 2, this embodiment also provides a Pull mode and Push mode combined resource management and job scheduling system, which comprises a scheduling cluster and a computing cluster, wherein the scheduling cluster comprises one or more scheduling nodes, the computing cluster comprises a plurality of computing nodes, and each scheduling node manages one or more corresponding computing nodes. The scheduling node is programmed or configured to execute the steps of the above Pull mode and Push mode combined resource management and job scheduling method, or a computer program programmed or configured to execute the above Pull mode and Push mode combined resource management and job scheduling method is stored in a memory of the scheduling node. As shown in FIG. 2, the resource management and job scheduling cluster of the resource management and job scheduling system comprises four computing node groups, which can communicate with each other to realize cooperative scheduling. All the computing nodes are divided into four groups according to the number of nodes in the scheduling cluster, and each group is managed by a scheduling node. As the scheduling nodes can communicate with each other, in fact, each scheduling node can use all the computing nodes. The figure shows two job scheduling modes, Push and Pull, wherein the Push mode is mainly used to push jobs from the scheduling cluster to the computing cluster, and is mainly used for high-performance computing jobs, and the Pull mode is mainly used to pull jobs from the computing nodes to the scheduling cluster, and is mainly used for big data processing jobs.

Each scheduling node maintains necessary information of the computing node group it manages, specifically comprising jobs running on the computing node group, jobs in a queue, and the computing node allocation table. Because the scheduling cluster cannot know the detailed information of resource (such as CPU, memory, and accelerator) usage on each computing node, it can only record whether the node has been allocated, so it can only maintain one bitmap identifying whether a node has been allocated. Three daemons run on each scheduling node: a job distribution process for the Push mode, a job request monitoring process for the Pull mode and a resource recovery process.

Each computing node maintains its own resource usage, specifically including CPU utilization, memory utilization, accelerator utilization, and running computing tasks. Accordingly, each computing node needs to maintain three daemons: a resource usage monitoring process, a job execution monitoring process and a job Pull process.

When a large-scale job submitted by a user similar to high-performance computing is received on the scheduling cluster, the scheduling system tries to distribute the job to the computing nodes in the Push mode. In this case, if a scheduling node cannot find enough computing resources in its computing node group, it can unite with other scheduling nodes to obtain more computing nodes through coordination.

When a small job submitted by a user is received on the scheduling cluster, scheduling can be appropriately delayed till a computing node group with idle resources actively pulls the job. The nodes in one computing node group can communicate with each other. Once a large number of resources are found idle through negotiation, active pulling tasks from the scheduling cluster may be performed.

In addition, this embodiment also provides a computer-readable storage medium, on which a computer program programmed or configured to execute the above Pull mode and Push mode combined resource management and job scheduling method is stored.

Those skilled in the art will appreciate that the embodiments of the invention may be provided as methods, systems, or computer program products. Therefore, the invention may take the form of a full hardware embodiment, a full software embodiment, or an embodiment combining software and hardware aspects. Furthermore, the present application may take the form of a computer program product implemented on one or more computer usable storage media (including but not limited to magnetic disk memory, CD-ROM, optical memory, etc.) having computer usable program code embodied therein. The application refers to the flowchart of the method, device (system) and computer program product according to the embodiments of the application and/or instructions executed by a processor to generate an apparatus for realizing the functions specified in one or more flows of the flowchart and/or one or more blocks of the block diagram. These computer program instructions may also be stored in a computer-readable memory which can direct a computer or other programmable data processing apparatus to function in a particular manner, such that the instructions stored in the computer-readable memory produce an article of manufacture including an instruction device which implements the functions specified in one or more flows in the flowcharts and/or one or more blocks in the block diagrams. These computer program instructions may also be loaded onto a computer or other programmable data processing apparatus such that a series of operational steps are performed on the computer or other programmable apparatus to produce a computer implemented process, such that the instructions executed on the computer or other programmable apparatus provide steps for implementing the functions specified in one or more flows in the flowcharts and/or one or more blocks in the block diagrams.

The above are only preferred embodiments of the invention, and the scope of protection of the invention is not limited to the above embodiments, but all technical schemes within the concept of the invention fall within the scope of protection of the invention. It should be noted that several improvements or embellishments made by those of ordinary skill in the art without departing from the principles of the invention should also be regarded as the scope of protection of the invention.

What is claimed is:

1. A Pull mode and Push mode combined resource management and job scheduling method, comprising following steps:
   1) receiving jobs;
   2) analyzing or identifying the jobs, and determining whether each of the jobs is a high-performance computing job or a big data processing job; and
   3) scheduling different types of the jobs respectively, distributing the high-performance computing jobs obtained by scheduling in a Push mode, that is, allocating computing nodes for the high-performance computing jobs and pushing the high-performance computing jobs to allocated computing nodes for execution; and distributing the big data processing jobs obtained by scheduling in a Pull mode, that is, waiting for job requests of the computing nodes, and when the computing nodes actively send the job requests, sending the big data processing jobs to the computing nodes which actively send the job requests for execution, wherein allocating the computing nodes for the high-performance computing jobs and pushing the high-performance computing jobs to the allocated computing nodes for execution in the step 3) specifically comprises following steps:

3.1A), reading a computing node allocation table to obtain available computing nodes which shows an available state for a current scheduling node;
   3.2A), determining whether the available computing nodes of the current scheduling node can meet requirements of the high-performance computing jobs, if so, directly taking the available computing nodes of the current scheduling node as the computing nodes allocated to the high-performance computing jobs, and otherwise, negotiating and communicating with other scheduling nodes to obtain available computing nodes of other scheduling nodes as auxiliary computing nodes, and jointly taking the available computing nodes of the current scheduling node and the auxiliary computing nodes as the computing nodes allocated to the high-performance computing jobs;
   3.3A), pushing the high-performance computing jobs to the allocated computing nodes for execution, and marking the allocated computing nodes as unavailable in the computing node allocation table; and
   3.4A), waiting for response results of the allocated computing nodes executing the high-performance computing jobs, and if the response result of the high-performance computing jobs returned by any of the allocated computing nodes is received, restoring an availability state of the allocated computing node in the computing node allocation table to be available.

2. The Pull mode and Push mode combined resource management and job scheduling method according to claim 1, wherein scheduling different types of the jobs in the step 3) specifically comprises following steps:
   S1), determining whether there are jobs which cannot tolerate waiting, if so, selecting a job which cannot tolerate waiting as a scheduled job and executing the step S1), and otherwise, jumping to next step;
   S2), determining whether there are jobs issued by designated high-performance computing applications, if so, selecting a job issued by the designated high-performance computing applications as the scheduled job and executing the step S1), and otherwise, jumping to next step;

S3), counting a number of processor cores occupied by already-scheduled-jobs through a sliding window, calculating an average number of processor cores occupied by all of the jobs, determining whether there are jobs which require larger number of processor cores than the average number, if so, selecting a job which requires larger number of processor cores than the average number as the scheduled job and executing the step S1), and otherwise, jumping to next step;

S4), determining whether there are workflow jobs containing multiple jobs, if so, selecting a workflow job containing multiple jobs as the scheduled job and executing the step S1), and otherwise, jumping to next step; and S5), determining whether jobs to be scheduled are empty, if not, selecting a workflow job containing multiple jobs as the scheduled job and executing the step S1), and otherwise, directly executing the step S1).

3. The Pull mode and Push mode combined resource management and job scheduling method according to claim 1, wherein when negotiating and communicating with other scheduling nodes in the step 3.2A) to obtain the available computing nodes of other scheduling nodes, other scheduling nodes obtain the available computing nodes which show the available state for the current scheduling node, and corresponding available computing nodes are returned to a scheduling node initiating negotiation and communication as the auxiliary computing nodes.

4. The Pull mode and Push mode combined resource management and job scheduling method according to claim 3, wherein the computing node allocation table is a BitMap, length of the computing node allocation table is a number of computing nodes managed by the current scheduling node, and each bit indicates the availability state of corresponding computing node by 1 and 0.

5. The Pull mode and Push mode combined resource management and job scheduling method according to claim 1, wherein the computing nodes actively sending the job requests specifically comprises: obtaining a resource usage of a current computing node, and if the resource usage of the current computing node is less than a preset value, actively sending a job request to a corresponding scheduling request.

6. The Pull mode and Push mode combined resource management and job scheduling method according to claim 5, wherein whether the resource usage of the current computing node is less than the preset value is determined based on one or more of CPU utilization, memory utilization, accelerator utilization, and a number of running computing tasks.

7. A Pull mode and Push mode combined resource management and job scheduling system, comprising a computer device, wherein the computer device is programmed or configured to execute the steps of the Pull mode and Push mode combined resource management and job scheduling method according to claim 1, or a computer program programmed or configured to execute the Pull mode and Push mode combined resource management and job scheduling method according to claim 1 is stored in a memory of the computer device.

8. A Pull mode and Push mode combined resource management and job scheduling system, comprising a scheduling cluster and a computing cluster, wherein the scheduling cluster comprises one or more scheduling nodes, the computing cluster comprises a plurality of computing nodes, and each of the scheduling nodes manages one or more corresponding computing nodes; and the scheduling nodes are programmed or configured to execute the steps of the Pull mode and Push mode combined resource management and job scheduling method according to claim 1, or a computer program programmed or configured to execute the Pull mode and Push mode combined resource management and job scheduling method according to claim 1 is stored in a memory of the scheduling nodes.

9. A non-transitory computer-readable storage medium, on which a computer program programmed or configured to execute the Pull mode and Push mode combined resource management and job scheduling method according to claim 1 is stored.

* * * * *